United States Patent
Harada et al.

(10) Patent No.: US 11,424,866 B2
(45) Date of Patent: *Aug. 23, 2022

(54) RADIO BASE STATION AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 2 days.

This patent is subject to a terminal disclaimer.

(21) Appl. No.: 16/856,746

(22) Filed: Apr. 23, 2020

(65) Prior Publication Data
US 2020/0252166 A1    Aug. 6, 2020

Related U.S. Application Data

(63) Continuation of application No. 15/750,118, filed as application No. PCT/JP2016/072924 on Aug. 4, 2016, now Pat. No. 10,673,570.

(30) Foreign Application Priority Data

Aug. 5, 2015   (JP) .................................. 2015-155361

(51) Int. Cl.
   *H04W 4/00*    (2018.01)
   *H04L 1/16*    (2006.01)
   (Continued)

(52) U.S. Cl.
   CPC ............ *H04L 1/1657* (2013.01); *H04L 1/187* (2013.01); *H04L 1/1812* (2013.01);
   (Continued)

(58) Field of Classification Search
   None
   See application file for complete search history.

(56) References Cited

U.S. PATENT DOCUMENTS

| 10,673,570 B2 * | 6/2020 | Harada ................. H04L 1/1657 |
| 2016/0057770 A1 * | 2/2016 | Yerramalli ............ H04L 67/146 370/329 |

(Continued)

FOREIGN PATENT DOCUMENTS

| CN | 108200780 A | 6/2018 |
| WO | 2016148622 | 9/2016 |

(Continued)

OTHER PUBLICATIONS

Office Action issued in corresponding European Patent Application No. 16833099.1, dated Jun. 8, 2021 (10 pages).

(Continued)

*Primary Examiner* — Clemence S Han
(74) *Attorney, Agent, or Firm* — Osha Bergman Watanabe & Burton LLP

(57) ABSTRACT

The present invention is designed to allow co-presence with other systems, and, furthermore, achieve improved spectral efficiency in cells (for example, unlicensed bands) in which pre-transmission listening is employed. The present invention provides a transmitter that transmits a downlink (DL) signal, a controller that controls DL transmission by applying listening before performing transmission of the DL signal, and a receiver that receives a delivery acknowledgement signal (ACK/NACK) in response to the DL transmission, wherein the controller controls a contention window value to apply to listening based on a number of acknowledgements (ACKs) in response to the DL transmission within a predetermined period, and a number of codewords and/or a number of transport blocks for the DL transmission.

7 Claims, 11 Drawing Sheets

(51) Int. Cl.
  *H04W 16/14* (2009.01)
  *H04W 28/04* (2009.01)
  *H04W 72/08* (2009.01)
  *H04L 1/18* (2006.01)

(52) U.S. Cl.
  CPC ........... *H04L 1/1867* (2013.01); *H04W 16/14* (2013.01); *H04W 28/04* (2013.01); *H04W 72/08* (2013.01); *H04W 72/082* (2013.01)

(56) References Cited

U.S. PATENT DOCUMENTS

| | | | |
|---|---|---|---|
| 2016/0142192 A1* | 5/2016 | Damnjanovic ... | H04W 74/0816 370/329 |
| 2016/0270100 A1* | 9/2016 | Ng ........................... | H04L 5/001 |
| 2016/0345326 A1* | 11/2016 | Yerramalli ............ | H04L 1/1812 |
| 2017/0005768 A1* | 1/2017 | Yin ........................ | H04L 1/1867 |
| 2017/0019909 A1* | 1/2017 | Si ........................... | H04W 76/28 |
| 2017/0055296 A1* | 2/2017 | Cheng .................. | H04W 74/004 |
| 2018/0115981 A1* | 4/2018 | Kim ....................... | H04W 24/10 |
| 2018/0124828 A1* | 5/2018 | Kim ....................... | H04W 74/00 |
| 2018/0139779 A1* | 5/2018 | Kim ....................... | H04L 1/1812 |
| 2018/0152267 A1* | 5/2018 | Andreoli-Fang ......... | H04L 1/08 |
| 2018/0175975 A1* | 6/2018 | Um ........................ | H04W 72/14 |
| 2018/0184459 A1* | 6/2018 | Kim ........................ | H04L 5/00 |
| 2018/0220459 A1* | 8/2018 | Park ....................... | H04W 74/08 |

FOREIGN PATENT DOCUMENTS

| | | |
|---|---|---|
| WO | 2016148622 A1 | 9/2016 |
| WO | 2017004256 | 1/2017 |
| WO | 2017004256 A1 | 1/2017 |

OTHER PUBLICATIONS

International Search Report of the International Searching Authority issued in PCT/JP2016/072924 dated Oct. 25, 2016 (1 page).
Written Opinion of the International Searching Authority issued in PCT/JP2016/072924 dated Oct. 25, 2016 (4 pages).
Alcatel-Lucent Shanghai Bell, et al.; "Evaluation results for LAA and Wi-Fi Coexistence with DL-Only LAA"; 3GPP TSG RAN WG1 Meeting #81, R1-153384; Fukuoka, Japan; May 25-29, 2015 (6 pages).
Ericsson; "Discussion on LBT Protocols"; 3GPP TSG RAN WG1 Meeting #80bis, R1-151996; Belgrade, Serbia; Apr. 20-24, 2015 (9 pages).
3GPP TS 36.300 V12.4.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
AT&T; "Drivers, Benefits and Challenges for LTE in Unlicensed Spectrum"; 3GPP TSG-RAN Meeting #62, RP-131701; Busan, Korea; Dec. 3-6, 2013 (3 pages).
Office Action issued in corresponding Japanese Patent Application No. 2015-155361, dated Oct. 18, 2016 (5 pages).
Extended European Search Report issued in the counterpart European Patent Application No. 16833099.1, dated Jul. 6, 2018 (12 pages).
LG Electronics; "DL LBT operation with variable contention window size"; 3GPP TSG RAN WG1 meeting #81 R1-152732; Fukuoka, Japan, May 25-29, 2015 (6 pages).
Samsung; "Further discussion on LBT for LAA DL transmission"; 3GPP TSG RAN WG1 Meeting #81 R1-152874 Fukuoka, Japan, May 25-29, 2015 (5 pages).
Extended European Search Report issued in Application No. 21194794.0 dated Dec. 21, 2021 (11 pages).
Office Action in counterpart Chinese Application No. 201680045980.4 dated Aug. 13, 2021 (18 pages).
Decision to refuse a European Patent Application issued in European Application No. 16833099.1; dated Dec. 6, 2021 (16 pages).

* cited by examiner

RADIO BASE STATION AND RADIO COMMUNICATION METHOD

CROSS-REFERENCE TO RELATED APPLICATIONS

This application is a continuation application and, thereby, claims benefit under 35 U.S.C. § 120 to U.S. patent application Ser. No. 15/750,118, filed on Feb. 2, 2018, titled "RADIO BASE STATION, USER TERMINAL AND RADIO COMMUNICATION METHOD," which is a national stage application of PCT Application No. PCT/JP2016/072924, filed on Aug. 4, 2016, which claims priority to Japanese Patent Application No. 2015-155361, filed on Aug. 5, 2015. The contents of these applications are incorporated by reference in their entirety.

BACKGROUND

Technical Field

The present invention relates to a radio base station, a user terminal and a radio communication method in next-generation mobile communication systems.

Background Art

In the UMTS (Universal Mobile Telecommunications System) network, the specifications of long term evolution (LTE) have been drafted for the purpose of further increasing high speed data rates, providing lower delays and so on (see non-patent literature 1). The specifications of LTE-advanced (Rel. 10 to 12) have been drafted for the purpose of achieving further broadbandization and higher speeds beyond LTE, and, in addition, for example, a successor system of LTE—referred to as "5G" (5th generation mobile communication system)—is under study.

In LTE of Rel. 8 to 12, the specifications have been drafted assuming exclusive operations in frequency bands that are licensed to operators—that is, licensed bands. As licensed bands, for example, 800 MHz, 2 GHz and/or 1.7 GHz are used.

User traffic has been increasing steeply following the spread of high-performance user terminals/user equipment (referred to as "UE") such as smart-phones and tablets. Although more frequency bands need to be added to meet this increasing user traffic, licensed bands have limited spectra (licensed spectra). Consequently, a study is in progress to enhance the frequencies of LTE systems by using bands of unlicensed spectra (hereinafter referred to as "unlicensed bands") that are available for use apart from licensed bands (see non-patent literature 2).

For unlicensed band, for example, 2.4 GHz, which is the same as in Wi-Fi (registered trademark), or the 5 GHz band and/or the like may be used. With Rel. 13 LTE, a study is in progress to execute carrier aggregation (CA) between licensed bands and unlicensed bands. Communication that is carried out by using unlicensed bands with licensed bands like this is referred to as "LAA" (License-Assisted Access). In the future, dual connectivity (DC) between licensed bands and unlicensed bands and stand-alone in unlicensed bands may become the subject of study under LAA.

Non-Patent Literature 1: 3GPP TS 36. 300 "Evolved Universal Terrestrial Radio Access (E-UTRA) and Evolved Universal Terrestrial Radio Access Network (E-UTRAN); Overall Description; Stage 2"

Non-Patent Literature 2: AT&T, Drivers, Benefits and Challenges for LTE in Unlicensed Spectrum, 3GPP TSG-RAN Meeting #62 RP-131701

SUMMARY

A study is in progress to introduce interference control functionality to unlicensed bands, in order to allow co-presence with other operators' LTE, Wi-Fi or different systems. In Wi-Fi, LBT (Listen Before Talk), which is based on CCA (Clear Channel Assessment), is used as an interference control function within the same frequency.

Consequently, when unlicensed bands are configured in LTE systems, UL transmission and/or DL transmission may be controlled by implementing "listening" (for example, LBT) as an interference control function. In this case, there is a demand to enable both efficient and fair co-presence with other systems (for example, Wi-Fi) and other LTE operators, and efficient operation of frequencies.

The present invention has been made in view of the above, and one or more embodiments of the present invention provide a radio base station, a user terminal and a radio communication method that can allow co-presence with other systems, and that can furthermore achieve improved spectral efficiency in cells (for example, unlicensed bands) in which pre-transmission listening is employed.

According to the present invention, a radio base station has a transmission section that transmits a DL signal, a control section that performs listening before the DL signal is transmitted, and controls DL transmission, and a receiving section that receives a delivery acknowledgement signal (ACK/NACK) in response to the DL transmission, and the control section controls a contention window size to apply to listening based on the number of NACKs in response to a predetermined period of DL transmission.

According to the present invention, it is possible to allow co-presence with other systems, and, furthermore, achieve improved spectral efficiency in cells in which pre-transmission listening is employed (for example, unlicensed bands).

DETAILED DESCRIPTION

Figure 1A:
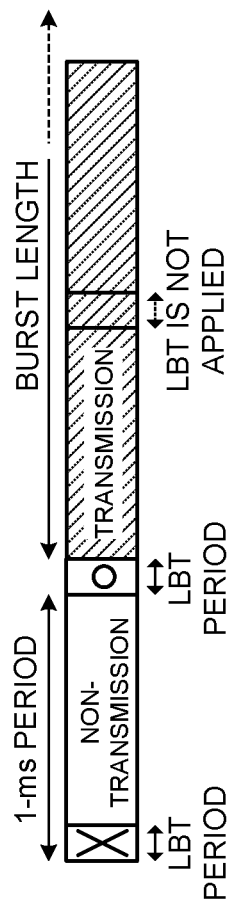
FIGS. 1A-1B provide diagrams, each showing an example of a radio frame configuration in LBT.

As mentioned earlier, in unlicensed bands, interference control functionality is necessary in order to allow co-presence with other operators' LTE, Wi-Fi (registered trademark), or different systems. In Wi-Fi, the function called "LBT" (Listen Before Talk), which is based on CCA, is implemented as an interference control function for use within the same frequency. In Japan and Europe, the LBT function is stipulated as mandatory in systems that are run in the 5 GHz unlicensed band, such as Wi-Fi.

Consequently, a study is in progress to apply interference control within the same frequency by executing listening before transmitting signals even in systems where LTE/LET-A is run in unlicensed bands (for example, LAA systems). In a carrier in which listening is configured, radio base stations and user terminals of a plurality of systems may use the same frequency bands on a shared basis.

The application of listening makes it possible to prevent interference between LAA and Wi-Fi, interference between LAA systems, and so on. Furthermore, even when user terminals that can be connected are controlled independently for every operator that runs an LAA system, it is possible to reduce interference without learning the details of each operator's control, by means of listening.

Here, "listening" refers to the operation which a given transmission point (for example, a radio base station, a user terminal, etc.) performs before transmitting signals in order to check whether or not signals to exceed a predetermined level (for example, predetermined power) are being transmitted from other transmission points. Also, this "listening" performed by radio base stations and/or user terminals may be referred to as "LBT" (Listen Before Talk), "CCA" (Clear Channel Assessment), "carrier sensing" and so on.

For example, when LBT is employed in an LTE system, a transmission point (an LTE-U base station and/or a user terminal) performs listening (LBT, CCA) before transmitting UL signals and/or DL signals in an unlicensed band. Then, if no signals from other systems (for example, Wi-Fi) and/or other LAA transmission points are detected, the transmission point carries out communication in the unlicensed band.

If received power that is equal to or lower than a predetermined threshold is measured in LBT, the transmission point judges that the channel is in the idle state (LBT-idle), and carries out transmission. When a "channel is in the idle state," this means that, in other words, the channel is not occupied by a certain system, and it is equally possible to say that a channel is "idle," a channel is "clear," a channel is "free," and so on.

On the other hand, when the received power that is measured in LBT exceeds a predetermined threshold, the transmission point judges that the channel is in the busy state (LBT-busy), and limits transmission. Procedures that are taken when listening yields the result "LBT-busy" include (1) making a transition to another carrier by way of DFS (Dynamic Frequency Selection), (2) applying transmission power control (TPC), (3) holding transmission (stopping transmission or waiting for transmission), and so on. In the event LBT-busy is yielded, LBT is carried out again with respect to this channel, and the channel becomes available for use only after it is confirmed that the channel is in the idle state. Note that the method of judging whether a channel is in the idle state/busy state based on LBT is by no means limited to this.

For example, assume a case where, when a user terminal that communicates by using a carrier (which may also be referred to as a "frequency") of an unlicensed band detects another entity (another user terminal and/or the like) that is communicating in this unlicensed band carrier, transmission is banned in this carrier. In this case, this user terminal performs LBT at a timing that is a predetermined period ahead of a transmission timing. By executing LBT, the user terminal searches the whole band of the applicable carrier at a timing that is a predetermined period ahead of a transmission timing, and checks whether or not other devices (radio base stations, LAA-UEs, Wi-Fi devices and so on) are communicating in this carrier's band. Only if it is confirmed that no such communication is in progress, is transmission carried out using this carrier. On the other hand, if only just a portion of the band is detected to be used by another device—that is, if the received power of a signal from another device entering this band exceeds a threshold—the user terminal stops its transmission. Here, if the received signal power in the LBT period is higher than a predetermined threshold, the channel is judged to be in the busy state (LBT-busy). If the received signal power in the LBT period is lower than the predetermined threshold, the channel is judged to be in the idle state (LBT-idle).

Also, there are roughly two types of LBT mechanisms—namely, LBE (Load-Based Equipment) and FBE (Frame-Based Equipment). With LBE, initial CCA is performed, and transmission is started if LBT-idle is yielded, or the ECCA (extended CCA) procedure is performed if LBT-busy is yielded. That is, LBE refers to a mechanism of extending the carrier sensing duration when the result of carrier sensing shows that the channel cannot be used, and continuing executing carrier sensing until the channel becomes available for use. In LBE, random backoff is required to avoid contention adequately.

FBE executes carrier sensing in fixed timings and in a fixed cycle, and starts transmission if LBT-idle is yielded, or waits until the next carrier sensing timing if LBT-busy is yielded. That is, FBE has a fixed frame cycle, and is a mechanism of carrying out transmission if the result of executing carrier sensing in a predetermined frame shows that a channel is available for use, and not making transmission but waiting until the next carrier sensing timing if no channel can be used.

Figure 1B:
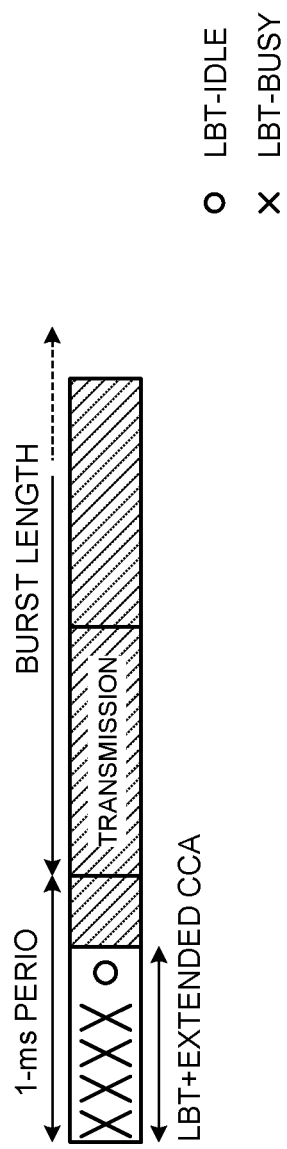

FIG. 1 provide diagrams, each showing an example of a radio frame configuration in LBT. FIG. 1A shows an example of an FBE radio frame configuration. In the event of FBE, the LBT duration and the LBT cycle are fixed, and LBT is performed in a predetermined number of symbols (for example, one to three symbols) and a cycle (for example, every 1 ms). Meanwhile, FIG. 1B shows an example of an LBE radio frame configuration. In the event of LBE, the LBT duration is not fixed. For example, LBT symbols may continue until a predetermined condition is fulfilled. To be more specific, a radio base station may continue executing LBT until LBT-idle is observed. Note that, although the present embodiment can be suitably applied to LBE, which uses random backoff, this is by no means limiting.

Figure 2:
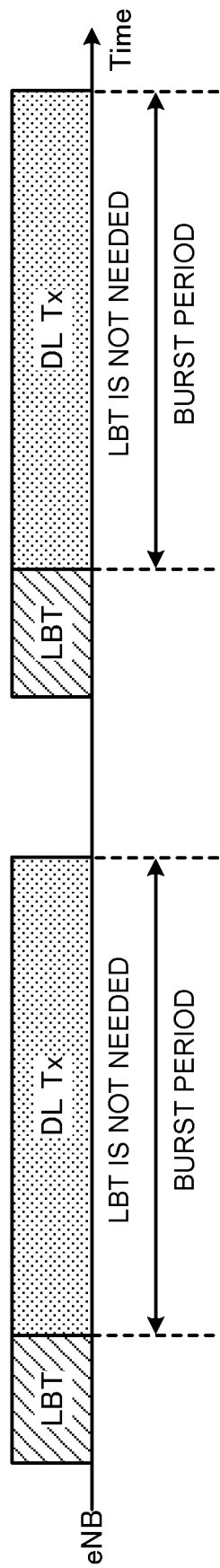
FIG. 2 is a diagram to show examples of a burst period that is configured for transmission after DL-LBT.

For example, when the result of listening for DL transmission (DL-LBT) which a radio base station executes shows LBT-idle, the radio base station is allowed to skip LBT and transmit signals for a predetermined period (see FIG. 2). In cells where listening is employed, the period after listening (after LBT-idle is yielded) in which transmission can be made without executing LBT is referred to as the "burst period" (also referred to as the "burst transmission period," "burst length," "maximum burst length," "maximum possible burst length" and so on).

In this way, even in LTE/LTE-A systems that use unlicensed bands, listening may be used before UL transmission and/or DL transmission are made. In this case, there is a demand to enable both efficient and fair co-presence with other systems (for example, Wi-Fi) and other LTE operators, and efficient operation of frequencies.

In order to enable fair co-presence with other systems (for example, Wi-Fi), it may be possible to apply random backoff to listening even when LTE/LTE-A systems are used in unlicensed bands, and, furthermore, employ the mechanism to make the window size in random backoff variable. Random backoff refers to the mechanism, whereby, even when a channel enters the idle state, each transmission point does not start transmission soon, but holds transmission for a randomly-configured period and then starts transmission when the channel is clear. By this means, transmission opportunities are distributed among a plurality of transmission points, and fairness is guaranteed. The window size in random backoff (also referred to as "contention window" (CW)) refers to the window size for determining the range of the backoff period, which is configured randomly.

For example, when a channel is in the occupied state (busy state) in an unlicensed band, each transmission point (access point) starts transmitting data when the channel is judged to be in the idle state based on listening. In this case, if a plurality of transmission points that have been waiting for the channel to enter the idle state start transmitting all at once, this has a high possibility of leading to collisions between transmission points. So, in order to reduce collisions between transmission points, each transmission point does not start transmission soon even when a channel assumes the idle state, but holds transmission for a randomly-configured period to reduce the likelihood of collisions between transmission points (random backoff).

The backoff period that is configured in each transmission point can be determined based on counter values (random values), which are configured on a random basis. The range of counter values is determined based on the contention window (CW) size, and, for example, the counter values are configured on a random basis from the range of 0 to the CW size (integer value).

Figure 3:
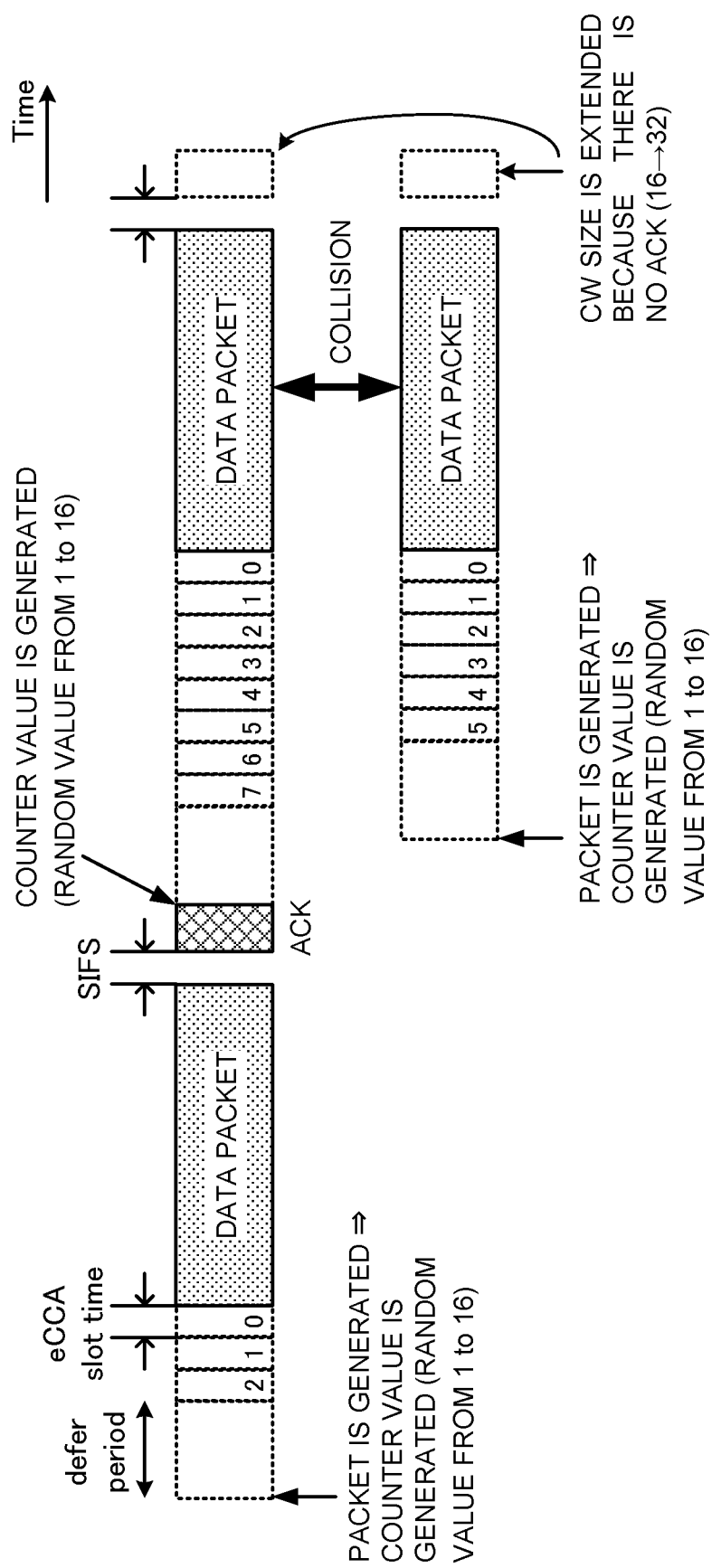
FIG. 3 is diagram to show an example of a case where random backoff is applied to listening.

FIG. 3 shows an example of application of random backoff. A transmission point generates a counter value for random backoff when judging that a channel is in the idle state based on CCA. Then, the transmission point retains the counter value until it is confirmed that the channel has been idle for a waiting time of a predetermined period (also referred to as "defer period" (D_eCCA)). When it is confirmed that the channel has been idle for predetermined period, the transmission point can then perform sensing in a predetermined time unit (for example an eCCA slot time unit), lower the counter value if the channel is idle, and make transmission when the counter value becomes zero.

In random backoff, the counter value is determined from a range that is associated with the CW size. FIG. 3 shows a case where a random value is detected from among 1 to 16 in the backoff period.

In Wi-Fi, the CW size is changed depending on whether or not an there is an ACK from the receiving end. For example, in UL transmission and DL transmission, when a packet is transmitted from a transmission point and yet an ACK is not returned from the receiving end, the transmission point judges that a collision has occurred, and expands the CW size. FIG. 3 shows a case where the CW size is expanded from 16 to 32 when there is no ACK feedback in response to packet transmission.

Even when an LTE system is run in an unlicensed band, too, it is likewise possible that a transmission point (a radio base station and/or a user terminal) employs random backoff as in Wi-Fi, and controls/changes the CW size depending on whether or not there is an ACK.

However, while, in Wi-Fi, one burst transmission is basically directed to only one terminal, in LTE/LTE-A systems (LAA), data for a plurality of user terminals is included in one burst transmission. The present inventors have thus focused on the fact that LTE systems are different from Wi-Fi in that a plurality of user terminals feed back delivery acknowledgement signals (ACKs/NACKs) in response to one burst transmission.

Consequently, when listening is used in LTE systems, there is a possibility that, if the CW size is changed depending on whether or not an ACK is fed back from one user terminal, as done in Wi-Fi, the CW size may be expanded unnecessarily. For example, cases might occur where, even though data transmission is made adequately for the majority of user terminals, data cannot be transmitted to a specific user terminal, and therefore the CW size is expanded. When the CW size is expanded unnecessarily, the idle time before transmitting signals becomes longer, and this has a threat of leading to a decrease in spectral efficiency, loss of transmission opportunities, and so on.

Furthermore, since LTE systems employ retransmission control (HARQ) and so on, the normal target block error rate (BLUR) is 10% or so, and modulation and coding schemes (MCS) are configured. Consequently, cases occur where a NACK is received when it is not even necessary to expand the CW size (when, for example, there is no collision). In such cases, there is a possibility that the CW size is expanded unnecessarily even in situations where collisions are not a problem.

So, assuming the case in which listening is employed in LTE/LTE-A systems (LAA); the present inventors have come up with the idea of controlling the CW size based on the number of ACKs and/or the number of NACKs in response to data included in transmission after listening (for example, burst transmission). For example, in listening in LAA, it is possible to count the number of NACKs in response to data that is included in burst transmission after listening, and control the CW size to be expanded when the number of NACKs counted exceeds a predetermined threshold.

By this means, it is possible to reduce the loss of transmission opportunities and the decrease of spectral efficiency due to unnecessary expansion of the CW size. Moreover, since the CW size can be by taking adequate situations into account, it is possible to realize fair co-presence with other systems.

Also, it is possible to determine a predetermined threshold by taking into consideration the number of users multiplexed in the target period for counting the number of NACKs (or the number of ACKs), or limit the range of burst transmission to be the target period for counting the number of NACKs. By this means, it is possible to change the CW size adequately depending on the situations of communication. Note that DTX may be included in the number of NACKs.

Now, the present embodiment will be described in detail below with reference to the accompanying drawings. Although the present embodiment will be described assuming that a frequency carrier in which listening (LBT) is not configured is a licensed band and a frequency carrier in which listening is configured is an unlicensed band, this is by no means limiting. The present embodiment is applicable to any carriers (or cells) in which listening is configured, regardless of whether a carrier is a licensed band or an unlicensed band.

Also, although examples will be described with the following description where listening for DL transmission is performed in radio base stations, this is by no means limiting. The present embodiment can be applied to any transmission points (for example, a user terminal) that employ listening. For example, the radio base stations in the following description are inter-changeable with user terminals. Also, although cases will be shown in the following description where listening is employed in LTE/LTE-A systems, the present embodiment is by no means limited to this. The present invention is applicable to any systems in which listening is performed before signals are transmitted, and in which a plurality of delivery acknowledgement signals (ACKs/NACKs) are fed back.

First Example

A case will be described with a first example where the CW size is controlled based on the number of NACKs in response to data that is included in burst transmission after listening. Note that DTX may be included in the number of NACKs, or the CW size may be controlled based on the number of ACKs, instead of the number of NACKs.

Figure 4:
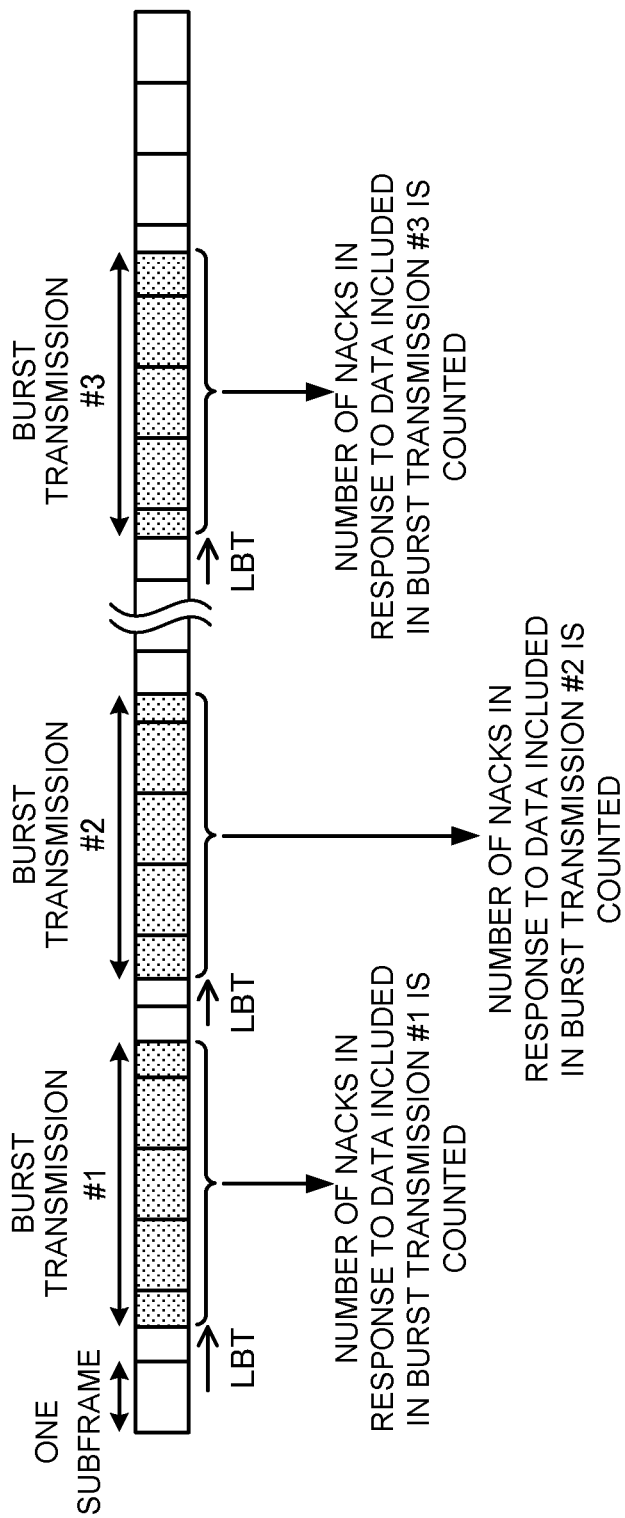
FIG. 4 is a diagram to show an example of a CW size control method according to one or more embodiments.

FIG. 4 is a diagram to show an example of DL transmission to which listening is applied. FIG. 4 shows a case where burst DL transmission of maximum 4 ms is configured when the result of listening shows the idle state. The duration of burst DL transmission is not limited to 4 ms and can be configured as appropriate.

According to the present embodiment, (1) the number of subframes in bursts in which the number of NACKs is counted (L subframes), (2) the cycle of bursts to count the number of NACKs (M bursts), and (3) a threshold number of NACKs (N) for deciding to expand the CW size can be configured as parameters for controlling the change of the CW size (counting the number of NACKs).

For example, assume the case where the number of NACKs is counted in subframes in a burst (here, L=4 subframes), and the case where the number of NACKs is counted in burst transmission following each listening (here, the burst cycle M=1 burst). In this case, a radio base station counts the number of NACKs in response to the DL data transmitted in each subframe in every burst transmission that follows LBT (in FIG. 4, burst transmission #1 to #3), and if the number of NACKs counted exceeds a predetermined threshold, expands the CW size.

When extending the CW size, for example, the radio base station can extended the CW size two twice the CW before the extension. On the other hand, when the number of NACKs is equal to or less than a predetermined threshold, the CW size is maintained. Alternatively, if the number of NACKs counted is equal to or less than a predetermined threshold and the CW size has been expanded to a larger value (for example, CW=16) than the initial value (for example, CW=8), the CW size is reset back to the initial value.

Furthermore, the radio base station can limit the period to count the number of NACKs (target burst transmissions) to part of the burst transmissions, not all the burst transmissions. Moreover, the radio base station can limit the transmission time intervals (TTIs) (for example, subframes) to be the target for counting the number of NACKs within burst transmission.

Figure 5A:
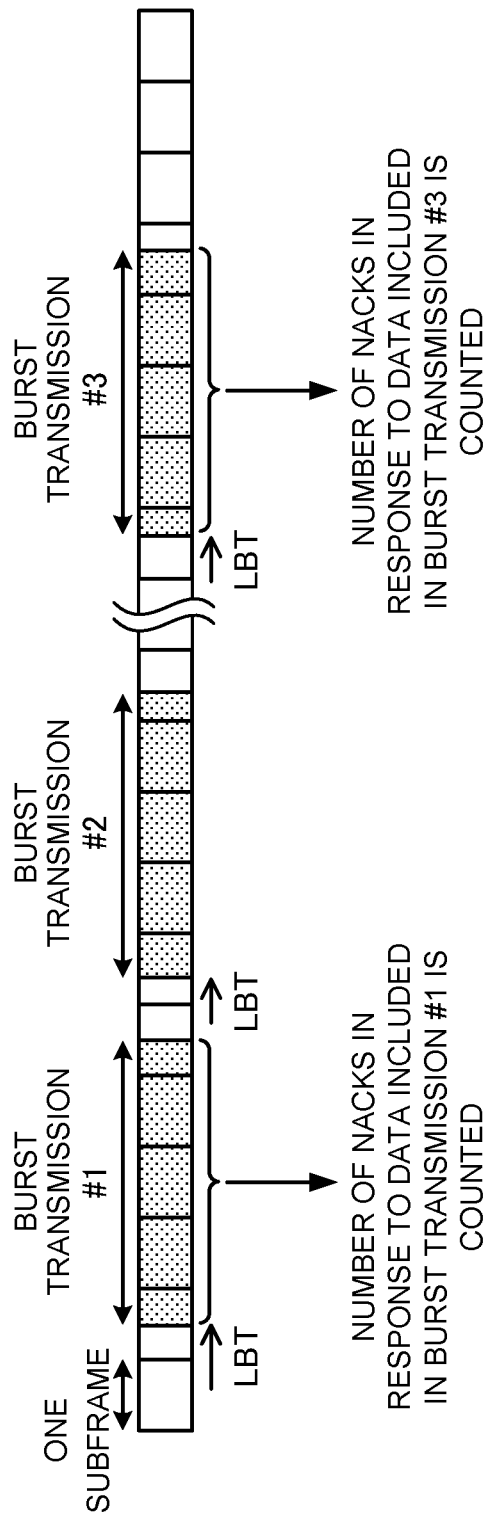
FIGS. 5A-5B provide diagrams to show examples of CW size control methods according to one or more embodiments.
Figure 5B:
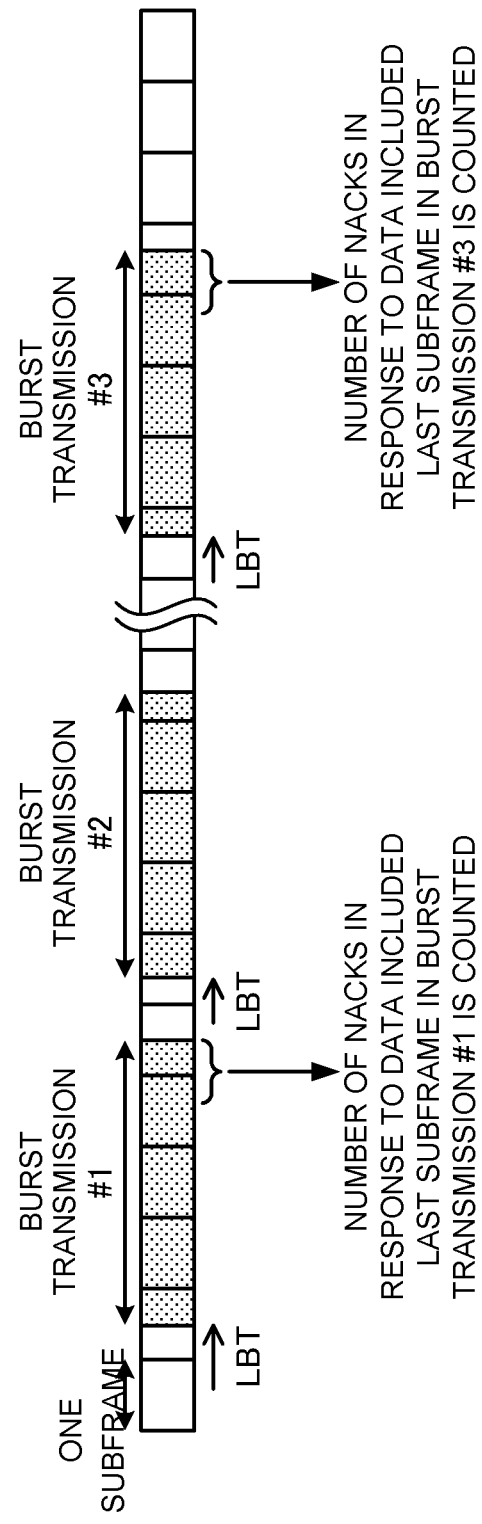

FIG. 5A shows a case where the number of NACKs is counted in a cycle of two bursts (burst cycle M=2), instead of making every burst transmission a target burst transmission to count the number of NACKs. Furthermore, FIG. 5B shows a case where, among a plurality of subframes in each target burst transmission in FIG. 5A, the number of NACKs is counted only in a predetermined subframe (here, the last subframe in each burst transmission). In this way, by limiting the burst transmissions and/or the transmission time intervals (for example, subframes) to the number of NACKs, it is possible to simplify the operation that accompanies the control of the CW size.

Note that, in FIG. 5B, the subframes can be a transmission time interval (for example, 1 ms) from the timing transmission is started after LBT. Alternatively, when a user terminal is also connected with another cell (for example, a licensed band), it is possible to configure the target subframes for counting the number of NACKs with reference to a transmission time interval that is configured in synchronization with the licensed band.

Note that the cycle of burst transmissions and the number of subframes to count the number of NACKs are not limited to those shown in FIG. 4 and FIG. 5. Now, an example of the method of configuring (1) the number of subframes in bursts in which the number of NACKs is counted (L subframes), (2) the cycle of bursts to count the number of NACKs (M bursts), and (3) a threshold number of NACKs (N) for deciding to expand the CW size will be described below.

(1) The Number of Subframes in Bursts in which the Number of NACKs is Counted (L Subframes)

The number of subframes to count the number of NACKs can be made 1 (L=1). In this case, the period where the number of NACKs needs to be counted is reduced, so that it is possible to simplify the operation for deciding to change the CW size. Alternatively, it is equally possible to make the number of subframes, L, to count the number of NACKs greater than 1 (for example, all subframes in burst transmission). By this means, when, for example, a case occurs where a large number of users' DL receipt fails due to collisions, this case can be brought to attention more quickly.

The number of subframes may be defined in the specification in advance, or may be configured upon communication. When the number of subframes is defined in advance in the specification, the number of subframes may be defined in relationship to (for example, in proportion to) the maximum burst length after listening, or may be made a fixed value regardless of the maximum burst length.

When the user terminal controls the CW size upon listening before UL transmission, the radio base station can report information about the number of subframes, to the user terminal, as an LBT parameter. In this case, the radio base station can configure information about the number of subframes in bursts to count the number of NACKs in the user terminal via higher layer signaling (for example, RRC signaling, broadcast signals, etc.). Furthermore, if the user terminal is connected with a licensed band as well, the radio base station may report the information about the number of subframes to the user terminal via the licensed band.

(2) The Cycle of Bursts to Count the Number of NACKs (M Bursts)

The cycle of bursts to count the number of NACKs can be made 1 (M=1). In this case, the change of the CW size is decided based on the burst transmission following each listening, so that it is possible to change the CW size flexibly. Furthermore, the cycle of bursts to count the number of NACKs can be configured to a greater value than 1. In this case, the burst transmissions to count the number of NACKs are reduced, so that it is possible to simplify the operation for deciding to change the CW size.

The burst cycle may be defined in the specification in advance, or may be configured upon communication. When the cycle of bursts is defined in advance in the specification, the burst cycle may be defined in relationship to the maximum burst length after listening, or may be made a fixed value regardless of the maximum burst length.

When the user terminal controls the CW size upon listening before UL transmission, the radio base station can report information about the burst cycle to the user terminal as an LBT parameter. In this case, the radio base station can configure information about the cycle of bursts to count the number of NACKs in the user terminal via higher layer signaling (for example, RRC signaling, broadcast signals, etc.). Furthermore, if the user terminal is connected with a licensed band as well, the radio base station may report the information about the burst cycle to the user terminal via the licensed band.

(3) The Threshold Number (N) of NACKs for Expanding the CW Size

The threshold number of NACKs for deciding to expand the CW size may be made 1 (N=1), or may be configured to a greater value than 1. Also, the threshold number of NACKs may be defined in the specification in advance, or may be configured upon communication. When the threshold number of NACKs is defined in advance in the specification, the threshold number of NACKs can be defined in relationship to (for example, in proportion to) at least one of the number of transport blocks (TBs) that are multiplexed in the period where the number of NACKs is counted (burst transmission period), the number of codewords (CWs), the number of user terminals and the number of HARQ processes. By this means, a predetermined threshold (the threshold number of NACKs) can be configured depending on the situation of communication, so that it is possible to prevent the CW size from being extended unnecessarily.

Alternatively, it is equally possible to make the threshold number of NACKs a fixed value regardless of the number of transport blocks (TBs) that are multiplexed in the period where the number of NACKs is counted (burst transmission period), the number of codewords (CWs), the number of user terminals and the number of HARQ processes.

When the user terminal controls the CW size upon listening before UL transmission, the radio base station can report information about the threshold number of NACKs for deciding to expand the CW size to the user terminal as an LBT parameter. In this case, the radio base station can configure information about the threshold number of NACKs in the user terminal via higher layer signaling (for example, RRC signaling, broadcast signals, etc.). Furthermore, if the user terminal is connected with a licensed band as well, the radio base station may report the information about the threshold number of NACKs to the user terminal via the licensed band.

Alternatively, when the user terminal controls the CW size upon listening before UL transmission, the user terminal may designate the CW size directly. In this case, the radio base station can configure information about the CW size to apply to UL LBT in the user terminal via higher layer signaling (for example, RRC signaling, broadcast signals, etc.). Furthermore, if the user terminal is connected with a licensed band as well, the radio base station may report the information about the CW size to the user terminal via the licensed band.

Second Example

Figure 6:
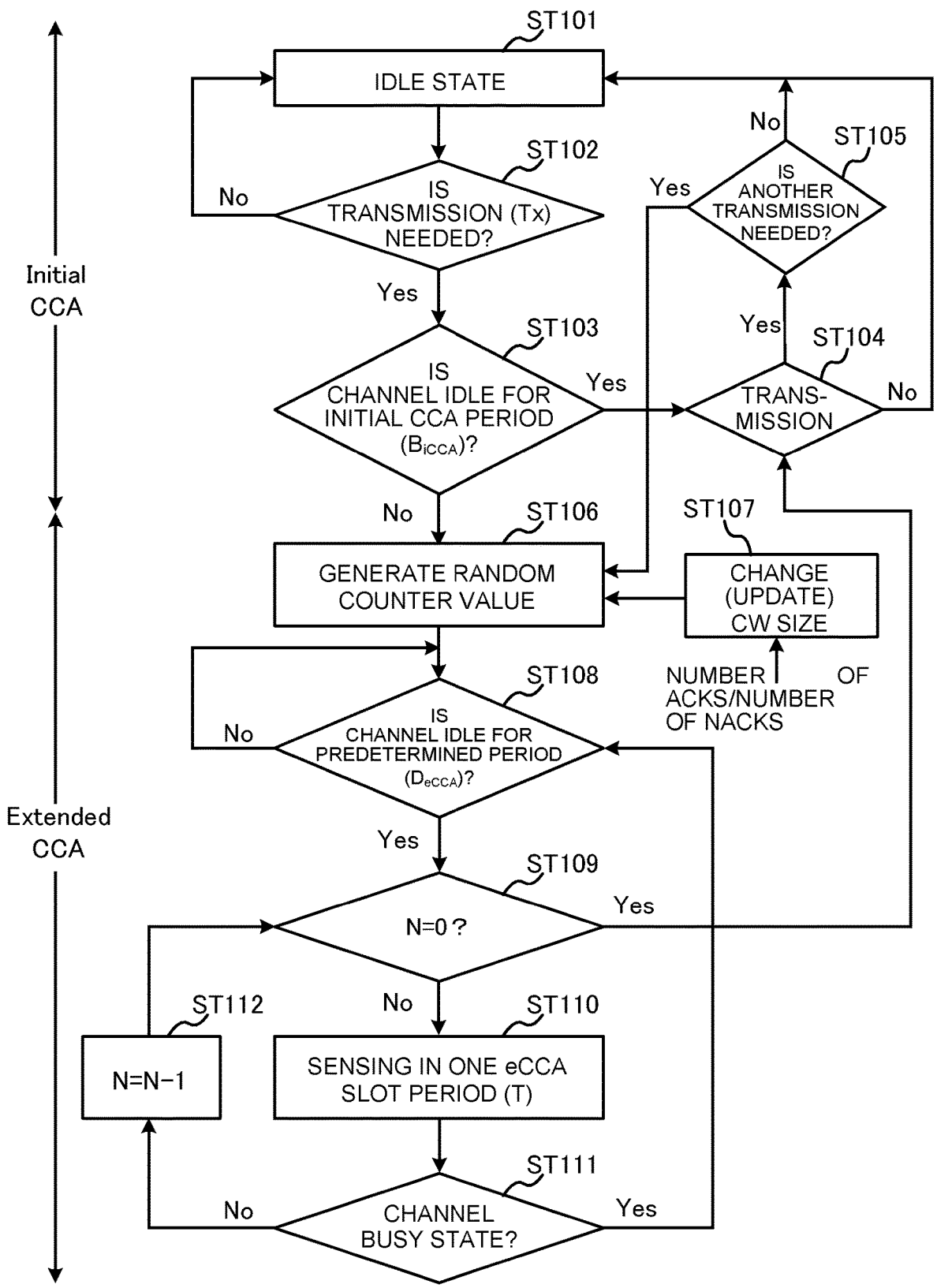
FIG. 6 is a diagram to show an example of listening operation steps according to one or more embodiments.

An example of the method of controlling the CW size in listening prior to DL transmission will be described with a second example. FIG. 6 shows an example of the listening operation according to the second example. Note that the following CW size control method can be applied to UL LBT (user terminal) as well.

When starting transmission from the idle state (which is, for example, the state the radio base station's buffer is empty) (ST101 and ST102: Yes), sensing is conducted in the initial LBT (CCA) period $B_{iCCA}$ (ST103). The initial LBT (CCA) period $B_{iCCA}$ may be, for example, 34 µs. If the result of sensing shows that a channel is available (idle state) (ST103: Yes), DL transmission is made (ST104).

If the initial CCA sensing shows that no channel is available (busy state) (ST103: No), or if transmission needs to be made for reasons other than that the idle state is assumed (for example, because there is another data transmission after ST104 (ST105: Yes)), random backoff is applied to listening. To be more specific, the radio base station generates a random counter value (N) in order to use random backoff (ST106). For the random counter value (N), an integer value that can be selected from the range of 0 to the CW size (q−1) may be used.

As has been shown earlier with the first example, the CW size (q) can be changed (updated) based on the number of ACKs and/or the number of NACKs in response to a predetermined period of DL transmission (burst DL transmission) (ST107). After generating the counter value, the radio base station checks whether a channel has been idle for a predetermined period (defer period ($D_{eCCA}$)) (ST108). The predetermined period (defer period ($D_{eCCA}$)) may be, for example, 34 µs. If the radio base station confirms that the channel has been idle for a predetermined period (ST108: Yes), the radio base station checks whether the counter value is 0 (ST109), and, if the counter value (N) is 0 (ST109: Yes), starts burst DL transmission (ST104).

If the counter value (N) is not 0 (ST109: No), the radio base station performs sensing per extended CCA (eCCA) slot period (T) (ST110), and checks the channel state (ST111). The extended CCA (eCCA) slot period (T) may be, for example, 9 µs or 10 µs. If the channel state is the busy state (ST111: Yes), the radio base station checks, again, if the channel has been idle for a predetermined period (defer period ($D_{eCCA}$)) (ST108).

If the channel state is the idle state (ST111: No), the radio base station decrements the counter value (N) by one (ST112). The radio base station continues executing sensing per extended CCA (eCCA) slot time (T) until the counter value becomes 0 (ST109 to ST112), and, when the counter value becomes 0 (ST109: Yes), starts burst DL transmission (ST104).

In this way, according to the second example, the CW size to apply to random backoff for listening is determined based on the number of ACKs and/or the number of NACKs in response to a predetermined period of DL transmission. By this means, it is possible to reduce the loss of transmission opportunities and the decrease of spectral efficiency due to unnecessary expansion of the CW size. Moreover, since the CW size can be by taking adequate situations into account, it is possible to realize fair co-presence with other systems.

(Structure of Radio Communication System)

Now, the structure of the radio communication system according to an embodiment of the present invention will be described below. In this radio communication system, the radio communication methods according to the embodiments of the present invention are employed. Note that the radio communication methods of the above-described example s may be applied individually or may be applied in combination.

Figure 7:
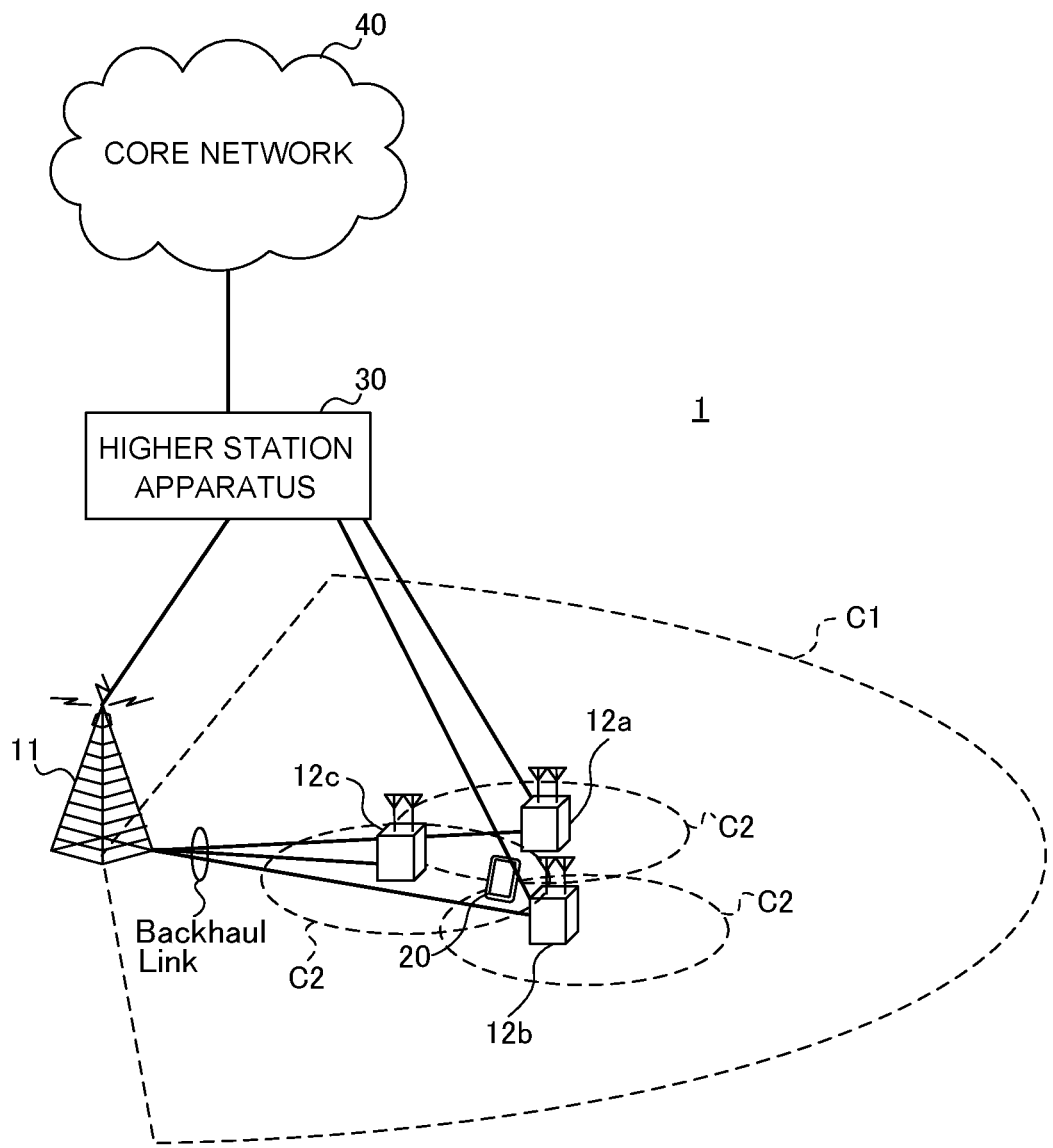
FIG. 7 is a schematic diagram to show an example of a radio communication system according to one or more embodiments.

FIG. 7 is a diagram to show an example of a schematic structure of a radio communication system according to an embodiment of the present invention. Note that the radio communication system shown in FIG. 7 is a system to incorporate, for example, an LTE system, super 3G, an LTE-A system and so on. In this radio communication system, carrier aggregation (CA) and/or dual connectivity (DC) to bundle multiple component carriers (CCs) into one can be used. Also, these multiple CCs include licensed band CCs to use licensed bands and unlicensed band CCs to use unlicensed bands. Note that this radio communication system may be referred to as "IMT-Advanced," or may be referred to as "4G," "5G," "FRA" (Future Radio Access) and so on.

The radio communication system 1 shown in FIG. 7 includes a radio base station 11 that forms a macro cell C1, and radio base stations 12 (12a to 12c) that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA by using at least two CCs (cells), or use six or more CCs.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Between the radio base station 11 and the radio base stations 12 (or between two radio base stations 12), wire connection (optical fiber, the X2 interface, etc.) or wireless connection may be established.

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as "radio base stations 10," unless specified otherwise. The user terminals 20 are terminals to support various communication schemes such as LTE, LTE-A and so on, and may be either mobile communication terminals or stationary communication terminals.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, MIBs (Master Information Blocks) and so on are communicated by the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH may be frequency-division-multiplexed with the PDSCH (downlink shared data channel) and used to communicate DCI and so on, like the PDCCH.

Also, as downlink reference signals, cell-specific reference signals (CRSs), channel state measurement reference signals (CSI-RSs: Channel State Information-Reference Signals), user-specific reference signals (DM-RSs: Demodulation Reference Signals) for use for demodulation, and other signals are included.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgment signals (HARQ-ACKs) and so on are communicated by the PUCCH. By means of the PRACH, random access preambles (RA preambles) for establishing connections with cells are communicated.

<Radio Base Station>

Figure 8:
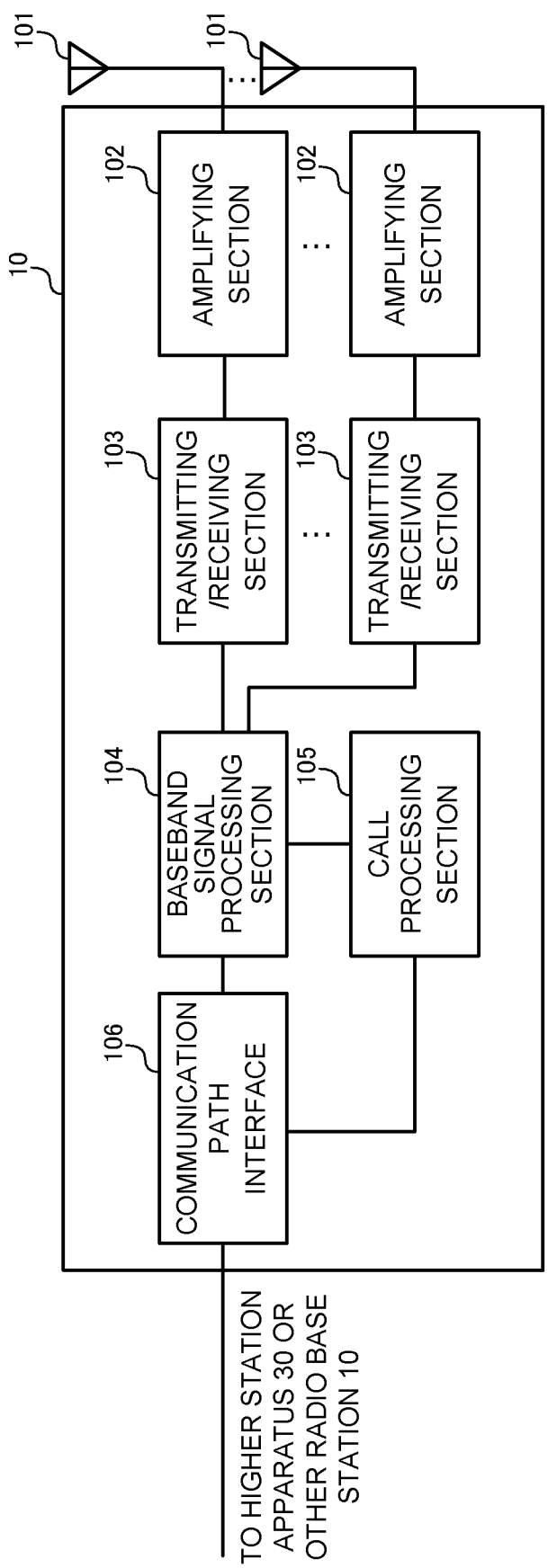
FIG. 8 is a diagram to explain an overall structure of a radio base station according to one or more embodiments.

FIG. 8 is a diagram to show an example of an overall structure of a radio base station according to one embodiment of the present invention. A radio base station 10 has a plurality of transmitting/receiving antennas 10, amplifying sections 102, transmitting/receiving sections 103, a baseband signal processing section 104, a call processing section 105 and a communication path interface 106. Note that the transmitting/receiving sections 103 are comprised of transmitting sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts baseband signals that are pre-coded and output from the baseband signal processing section 104 on a per antenna basis, into a radio frequency band. The radio frequency signals having been subjected to frequency conversion in the transmitting/receiving sections 103 are amplified in the amplifying sections 102, and transmitted from the transmitting/receiving antennas 101.

Meanwhile, as for uplink signals, radio frequency signals that are received in the transmitting/receiving antennas 101 are each amplified in the amplifying sections 102. Each transmitting/receiving section 103 receives uplink signals amplified in the amplifying sections 102. The received signals are converted into the baseband signal through frequency conversion in the transmitting/receiving sections 103 and output to the baseband signal processing section 104.

For example, the transmitting/receiving sections (receiving sections) 103 receive delivery acknowledgement signals (ACKs/NACKs) in response to DL transmission. Furthermore, the transmitting/receiving section (transmission section) 103 can report, to the user terminals, at least one of information about the number of subframes in UL burst transmission for counting the number of NACKs in response to UL transmission, information about the cycle of UL burst transmission to count the number of NACKs in response to UL transmission, information about a predetermined threshold against which the number of NACKs in response to UL transmission is compared, and information about the contention window size to apply to listening prior to UL transmission. Furthermore, when the result of DL-LBT that is performed before a DL signal is transmitted shows LBT-idle, the transmitting/receiving sections 103 can transmit the DL signal in an unlicensed band. Note that, for the transmitting/receiving sections 103, transmitters/receivers, transmitting/receiving circuits or transmitting/receiving devices that can be described based on common understanding of the technical field to which the present invention pertains can be used.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base stations 10 and manages the radio resources.

The communication path interface section 106 transmits and receives signals to and from the higher station apparatus 30 via a predetermined interface. The communication path interface 106 transmits and receives signals to and from neighboring radio base stations 10 (backhaul signaling) via an inter-base station interface (for example, optical fiber, the X2 interface, etc.).

Figure 9:
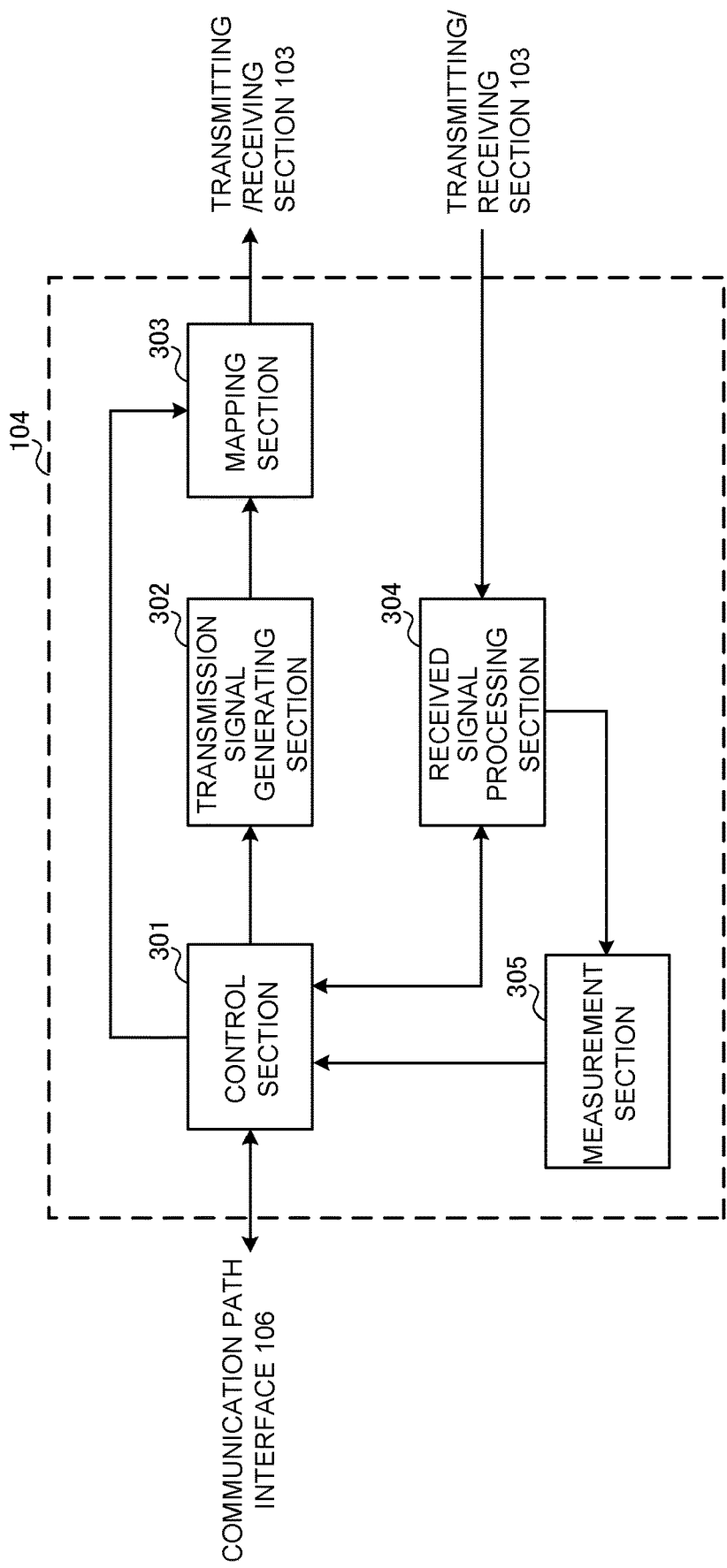
FIG. 9 is a diagram to explain a functional structure of a radio base station according to one or more embodiments.

FIG. 9 is a diagram to show an example of a functional structure of a radio base station according to the present embodiment. Note that, although FIG. 9 primarily shows functional blocks that pertain to characteristic parts of the present embodiment, the radio base station 10 has other functional blocks that are necessary for radio communication as well. As shown in FIG. 9, the baseband signal processing section 104 has a control section (scheduler) 301, a transmission signal generating section (generating section) 302, a mapping section 303, a received signal processing section 304 and a measurement section 305.

The control section (scheduler) 301 controls the scheduling (for example, resource allocation) of downlink data signals that are transmitted in the PDSCH and downlink control signals that are communicated in the PDCCH and/or the EPDCCH. Furthermore, the control section (scheduler) 301 also controls the scheduling of system information, synchronization signals, paging information, CRSs, CSI-RSs and so on.

Also, the control section 301 controls the scheduling of uplink reference signals, uplink data signals that are transmitted in the PUSCH, uplink control signals that are transmitted in the PUCCH and/or the PUSCH, random access preambles that are transmitted in the PRACH, and so on. Also, the control section 301 controls the transmission of DL signals based on the result of listening (DL LBT).

When DL LBT is used, the control section 301 can control the CW size to apply to listening based on the number of ACKs and/or the number of NACKs in response to a predetermined period of DL transmission (for example, burst DL transmission). For example, the control section 301 can change the CW size when the number of NACKs in response to DL transmission that is included in the whole period or in part of the period of one burst transmission after listening is greater than a predetermined threshold. Part of the period in burst transmission can be predetermined transmission time intervals (for example, subframes).

In addition, when burst transmission is carried out after each listening, the control section 301 can change the CW size when the number of NACKs in response to DL transmission that is included in part of the burst transmissions is greater than a predetermined threshold. Furthermore, the control section 301 can configure the predetermined threshold based on the value of at least one of the number of transport blocks that are multiplexed in the DL transmission period where the number of NACKs is counted, the number of codewords, the number of user terminals and the number of HARQ processes.

Also, when the number of NACKs in response to a predetermined period of DL transmission is equal to or greater than a predetermined threshold, the control section 301 can maintain the CW size or reset the CW size to the initial value. Note that, for the control section 301, a controller, a control circuit or a control device that can be described based on common understanding of the technical field to which the present invention pertains can be used.

The transmission signal generating section 302 generates DL signals based on commands from the control section 301 and outputs these signals to the mapping section 303. For example, the transmission signal generating section 302 generates DL assignments, which report downlink signal allocation information, and UL grants, which report uplink signal allocation information, based on commands from the control section 301. Also, the transmission signal generating section 302 can include information about the LBT to apply to UL transmission, in DL signals transmitted in unlicensed bands. Also, the transmission signal generating section 302 can include information as to whether or not UL-LBT is applied, in UL grants. Note that, for the transmission signal generating section 302, a signal generator, a signal generating circuit or a signal generating device that can be described based on common understanding of the technical field to which the present invention pertains can be used.

The mapping section 303 maps the downlink signals generated in the transmission signal generating section 302 to predetermined radio resources based on commands from the control section 301, and outputs these to the transmitting/receiving sections 103. Note that, for the mapping section 303, mapper, a mapping circuit or a mapping device that can be described based on common understanding of the technical field to which the present invention pertains can be used.

The receiving process section 304 performs receiving processes (for example, demapping, demodulation, decoding and so on) of UL signals (for example, delivery acknowledgement signals (HARQ-ACKs), data signals that are transmitted in the PUSCH, and so on) transmitted from the user terminals. The processing results are output to the control section 301. For the received signal processing section 304, a signal processor/measurer, a signal processing/measurement circuit or a signal processing/measurement device that can be described based on common understanding of the technical field to which the present invention pertains can be used.

Also, by using the received signals, the measurement section 305 can measure the received power (for example, the RSRP (Reference Signal Received Power)), the received quality (for example, the RSRQ (Reference Signal Received Quality)), channel states and so on. Also, upon listening before DL signal transmission in unlicensed bands, the measurement section 305 can measure the received power of signals transmitted from other systems and/or the like. The results of measurements in the measurement section 305 are output to the control section 301. The control section 301 can control the transmission of DL signals based on measurement results (listening results) in the measurement section 305.

The measurement section 305 can be constituted by a measurer, a measurement circuit or a measurement device that can be described based on common understanding of the technical field to which the present invention pertains.

<User Terminal>

Figure 10:
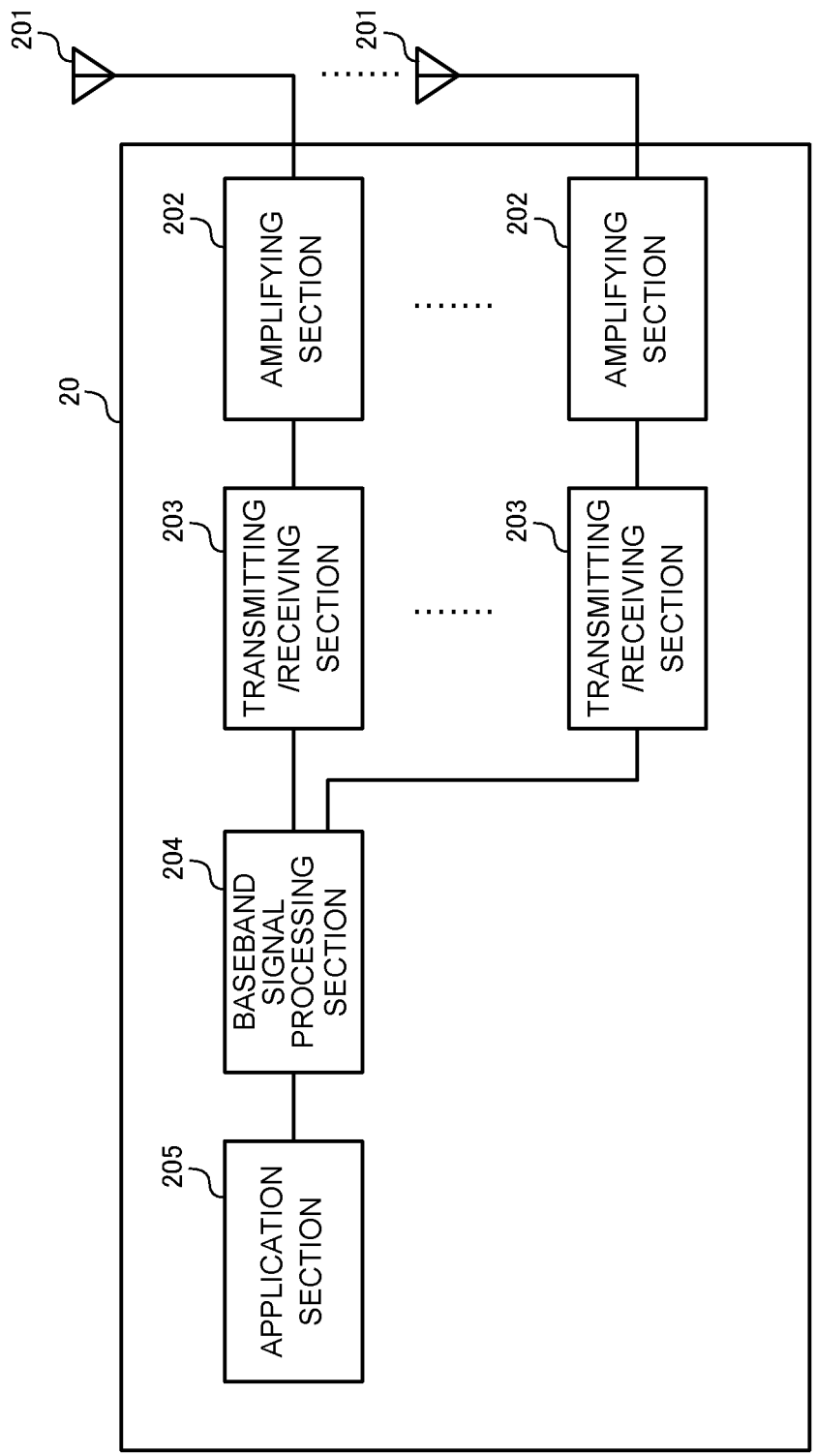
FIG. 10 is a diagram to explain an overall structure of a user terminal according to one or more embodiments.

FIG. 10 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205. Note that the transmitting/receiving sections 203 may be comprised of transmitting sections and receiving sections.

Radio frequency signals that are received in a plurality of transmitting/receiving antennas 201 are each amplified in the amplifying sections 202. Each transmitting/receiving section 203 receives the downlink signals amplified in the amplifying sections 202. The received signals are subjected to frequency conversion and converted into the baseband signal in the transmitting/receiving sections 203, and output to the baseband signal processing section 204.

The transmitting/receiving sections (receiving sections) 203 can receive DL signals (for example, UL grants) that command UL transmission in unlicensed bands, delivery acknowledgement signals (ACKs/NACKs) in response to UL transmission, and so on. Furthermore, the transmitting/receiving sections (receiving sections) 203 can receive at least one of information about the number of subframes in UL burst transmission for counting the number of NACKs in response to UL transmission, information about the cycle of UL burst transmission to count the number of NACKs in response to UL transmission, information about a predetermined threshold against which the number of NACKs in response to UL transmission is compared, and information about the contention window size to apply to listening prior to UL transmission. Note that, for the transmitting/receiving sections 203, transmitters/receivers, transmitting/receiving circuits or transmitting/receiving devices that can be described based on common understanding of the technical field to which the present invention pertains can be used.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to each transmitting/receiving section 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Figure 11:
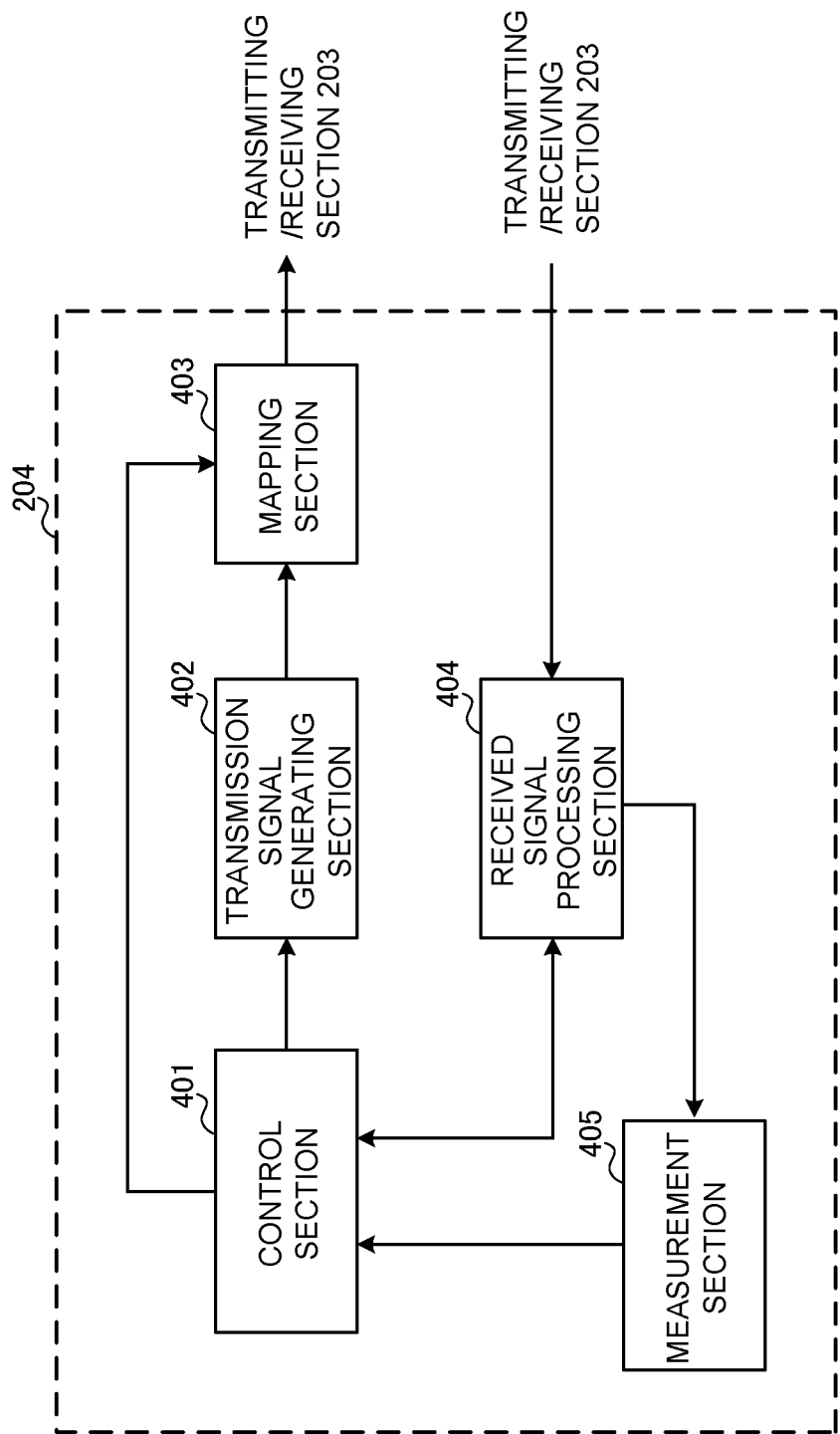
FIG. 11 is a diagram to explain a functional structure of a user terminal according to one or more embodiments.

FIG. 11 is a diagram to show an example of a functional structure of a user terminal according to the present embodiment. Note that, although FIG. 11 primarily shows functional blocks that pertain to characteristic parts of the present embodiment, the user terminal 20 has other functional blocks that are necessary for radio communication as well. As shown in FIG. 11, the baseband signal processing section 204 provided in the user terminal 20 has a control section 401, a transmission signal generating section 402, a mapping section 403, a received signal processing section 404 and a measurement section 405.

The control section 401 can control the transmission signal generating section 402, the mapping section 403 and the received signal processing section 404. For example, the control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation/transmission (UL transmission) of uplink control signals (for example, HARQ-ACKs and so on) and uplink data based on downlink control information (UL grants), the result of deciding whether or not retransmission control is necessary for downlink data, and so on. Also, the control section 401 controls the transmission of UL signals based on the result of listening (UL LBT).

When UL LBT is used, the control section 401 can control the CW size to apply to listening based on the number of ACKs and/or the number of NACKs in response to a predetermined period of UL transmission (for example, burst UL transmission). For example, the control section 401 can change the CW size when the number of NACKs in response to UL transmission that is included in the whole period or in part of the period of one burst transmission after listening is greater than a predetermined threshold. Part of the period in burst transmission may be, for example, a predetermined transmission time interval (for example, a subframe).

In addition, when burst transmission is carried out after each listening, the control section 401 can change the CW size when the number of NACKs in response to UL transmission that is included in part of the burst transmissions is greater than a predetermined threshold. Also, when the number of NACKs in response to a predetermined period of UL transmission is equal to or greater than a predetermined threshold, the control section 401 can maintain the CW size or reset the CW size to the initial value. Note that, for the control section 401, a controller, a control circuit or a control device that can be described based on common understanding of the technical field to which the present invention pertains can be used.

The transmission signal generating section 402 generates UL signals based on commands from the control section 401, and outputs these signals to the mapping section 403. For example, the transmission signal generating section 402 generates uplink control signals such as delivery acknowledgement signals (HARQ-ACKs) in response to DL signals, channel state information (CSI) and so on, based on commands from the control section 401.

Also, the transmission signal generating section 402 generates uplink data signals based on commands from the control section 401. For example, when a UL grant is included in a downlink control signal that is reported from the radio base station 10, the control section 401 commands the transmission signal generating section 402 to generate an uplink data signal. For the transmission signal generating section 402, a signal generator, a signal generating circuit or a signal generating device that can be described based on common understanding of the technical field to which the present invention pertains can be used.

The mapping section 403 maps the uplink signals (uplink control signals and/or uplink data) generated in the transmission signal generating section 402 to radio resources based on commands from the control section 401, and output the result to the transmitting/receiving sections 203. For the mapping section 403, mapper, a mapping circuit or a mapping device that can be described based on common understanding of the technical field to which the present invention pertains can be used.

The received signal processing section 404 performs the receiving processes (for example, demapping, demodulation, decoding and so on) of the DL signals (for example, downlink control signals that are transmitted from the radio base station in the PDCCH/EPDCCH, downlink data signals transmitted in the PDSCH, and so on). The received signal processing section 404 outputs the information received from the radio base station 10, to the control section 401 and the measurement section 405. Note that, for the received signal processing section 404, a signal processor/measurer, a signal processing/measurement circuit or a signal processing/measurement device that can be described based on common understanding of the technical field to which the present invention pertains can be used. Also, the received signal processing section 404 can constitute the receiving section according to the present invention.

Also, by using the received signals, the measurement section 405 may measure the received power (for example, the RSRP (Reference Signal Received Power)), the received quality (RSRQ (Reference Signal Received Quality)), channel states and so on. Furthermore, upon listening that is performed before UL signals are transmitted in unlicensed bands, the measurement section 405 can measure the received power of signals transmitted from other systems and so on. The results of measurements in the measurement section 405 are output to the control section 401. The control section 401 can control the transmission of UL signals based on measurement results (listening results) in the measurement section 405.

The measurement section 405 can be constituted by a measurer, a measurement circuit or a measurement device that can be described based on common understanding of the technical field to which the present invention pertains.

Note that the block diagrams that have been used to describe the above embodiments show blocks in functional units. These functional blocks (components) may be implemented in arbitrary combinations of hardware and software. Also, the means for implementing each functional block is not particularly limited. That is, each functional block may be implemented with one physically-integrated device, or may be implemented by connecting two physically-separate devices via radio or wire and using these multiple devices.

For example, part or all of the functions of radio base stations 10 and user terminals 20 may be implemented using hardware such as ASICs (Application-Specific Integrated Circuits), PLDs (Programmable Logic Devices), FPGAs (Field Programmable Gate Arrays), and so on. Also, the radio base stations 10 and user terminals 20 may be implemented with a computer device that includes a processor (CPU), a communication interface for connecting with networks, a memory and a computer-readable storage medium that holds programs. That is, the radio base stations and user terminals according to an embodiment of the present invention may function as computers that execute the processes of the radio communication method of the present invention.

Here, the processor and the memory are connected with a bus for communicating information. Also, the computer-readable recording medium is a storage medium such as, for example, a flexible disk, an opto-magnetic disk, a ROM (Read Only Memory), an EPROM (Erasable Programmable ROM), a CD-ROM (Compact Disc-ROM), a RAM (Random Access Memory), a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes.

Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Also, software and commands may be transmitted and received via communication media. For example, when software is transmitted from a website, a server or other remote sources by using wired technologies such as coaxial cables, optical fiber cables, twisted-pair cables and digital subscriber lines (DSL) and/or wireless technologies such as infrared radiation, radio and microwaves, these wired technologies and/or wireless technologies are also included in the definition of communication media.

Note that the terminology used in this description and the terminology that is needed to understand this description may be replaced by other terms that convey the same or similar meanings. For example, "channels" and/or "symbols" may be replaced by "signals" (or "signaling"). Also, "signals" may be "messages." Furthermore, "component carriers" (CCs) may be referred to as "carrier frequencies," "cells" and so on.

Also, the information and parameters described in this description may be represented in absolute values or in relative values with respect to a predetermined value, or may be represented in other information formats. For example, radio resources may be specified by indices.

The information, signals and/or others described in this description may be represented by using a variety of different technologies. For example, data, instructions, commands, information, signals, bits, symbols and chips, all of which may be referenced throughout the description, may be represented by voltages, currents, electromagnetic waves, magnetic fields or particles, optical fields or photons, or any combination of these.

The examples/embodiments illustrated in this description may be used individually or in combinations, and the mode of may be switched depending on the implementation. Also, a report of predetermined information (for example, a report to the effect that "X holds") does not necessarily have to be sent explicitly, and can be sent implicitly (by, for example, not reporting this piece of information).

Reporting of information is by no means limited to the examples/embodiments described in this description, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, MAC (Medium Access Control) signaling, and broadcast information (MIBs (Master Information Blocks) and SIBs (System Information Blocks))), other signals or combinations of these. Also, RRC signaling may be referred to as "RRC messages," and can be, for example, an RRC connection setup message, RRC connection reconfiguration message, and so on.

The examples/embodiments illustrated in this description may be applied to LTE (Long Term Evolution), LTE-A (LTE-Advanced), SUPER 3G, IMT-Advanced, 4G, 5G, FRA (Future Radio Access), CDMA 2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), and other adequate systems, and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this description with various components of steps in exemplary orders, the specific orders that illustrated herein are by no means limiting.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

The invention claimed is:

1. A radio base station comprising:
a transmitter that transmits a downlink (DL) signal;
a controller that controls DL transmission by applying listening before performing transmission of the DL signal; and
a receiver that receives a delivery acknowledgement signal (ACK/NACK) in response to the DL transmission,
wherein the controller controls a contention window value to apply to listening based on a number of acknowledgements (ACKs) in response to the DL transmission within a predetermined period, a number of codewords, and a number of transport blocks for the DL transmission.

2. The radio base station according to claim 1, wherein the controller increases the contention window value when the number of ACKs in response to the DL transmission within the predetermined period is less than a predetermined threshold that is determined based on the number of codewords and the number of transport blocks.

3. The radio base station according to claim 2, wherein the predetermined period is a predetermined subframe.

4. The radio base station according to claim 3, wherein the controller maintains the contention window value or changes the contention window value to an initial value when the number of ACKs in response to the DL transmission within the predetermined period is equal to or greater than the predetermined threshold.

5. The radio base station according to claim 2, wherein the controller maintains the contention window value or changes the contention window value to an initial value when the number of ACKs in response to the DL transmission within the predetermined period is equal to or greater than the predetermined threshold.

6. The radio base station according to claim 1, wherein the controller maintains the contention window value or changes the contention window value to an initial value when the number of ACKs in response to the DL transmission within the predetermined period is equal to or greater than a predetermined threshold.

7. A radio communication method comprising:
controlling transmission by applying listening before performing signal transmission;
carrying out the transmission when a result of listening fulfills a predetermined condition; and receiving a delivery acknowledgement signal (ACK/ NACK) in response to the transmission,
wherein a contention window value to apply to listening is controlled based on a number of ACKs in response to of transmission within a predetermined period, a number of codewords, and a number of transport blocks for the transmission.

* * * * *